(12) United States Patent
Fujimoto et al.

(10) Patent No.: US 6,455,834 B2
(45) Date of Patent: Sep. 24, 2002

(54) IMAGE READING APPARATUS AND LIGHT GUIDE MEMBER USED THEREFOR

(75) Inventors: Hisayoshi Fujimoto; Minori Torama, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 31 days.

(21) Appl. No.: 09/785,178

(22) Filed: Feb. 20, 2001

(30) Foreign Application Priority Data

Feb. 23, 2000 (JP) ........................................ 2000-046012

(51) Int. Cl.[7] .................................................. H04N 1/04
(52) U.S. Cl. .............................. 250/208.1; 250/227.11; 358/484; 362/26
(58) Field of Search ................................ 362/551, 555, 362/560, 297, 300, 311, 335, 26; 250/208.1, 216, 227.2, 227.11; 358/483, 484

(56) References Cited

U.S. PATENT DOCUMENTS

| | | | | |
|---|---|---|---|---|
| 6,166,832 A | * | 12/2000 | Fujimoto | 358/474 |
| 6,172,356 B1 | * | 1/2001 | Ogura et al. | 250/227.11 |
| 6,195,183 B1 | * | 2/2001 | Fujimoto et al. | 358/512 |
| 6,259,082 B1 | * | 7/2001 | Fujimoto et al. | 250/208.1 |

FOREIGN PATENT DOCUMENTS

JP 9-307696 11/1997 .......... H04N/1/028

\* cited by examiner

*Primary Examiner*—Sandra O'Shea
*Assistant Examiner*—John Amarantides
(74) *Attorney, Agent, or Firm*—Michael D. Bednarek; Shaw Pittman LLP

(57) ABSTRACT

An image reading apparatus includes a light source, an elongate light guide member for guiding light emitted from the light source toward an image read line, and a plurality of light receiving elements for receiving light reflected at the image read line. The light guide member includes a first portion, a second portion, and a connecting portion for connecting the first portion and the second portion. The first portion includes a light incidence surface facing the light source for entry of light emitted from the light source, and the light incidence surface is convexly curved widthwise of the light guide member. The second portion includes a light exit surface oriented toward the image read line for emitting light toward the image read line. The connecting portion is narrower than the first portion and the second portion.

15 Claims, 4 Drawing Sheets

IMAGE READING APPARATUS AND LIGHT GUIDE MEMBER USED THEREFOR

BACKGROUND OF THE INVENTION

1. Field of the Invention

The present invention relates to an image reading apparatus. It also relates to a light guide member used for an image reading apparatus.

2. Description of the Related Art

As is well known, a typical image reading apparatus incorporating a linear image sensor is designed to illuminate an image read line of a document with light emitted from a light source. The light reflected at the image read line is received by a plurality of light receiving elements. Each of the light receiving elements outputs signals corresponding to the received amount of light.

With such an image reading apparatus, if the image read line is not illuminated sufficiently, the image reading quality may be deteriorated. Therefore, light emitted from the light source needs to be effectively directed to the image read line. For this purpose, JP-A-9-307696 for example discloses an image reading apparatus in which a light guide member (prism) is arranged in facing relationship to a light source for guiding light emitted from the light source toward an image read line. In this image reading apparatus, light from the light source can be directed toward the image read line even if the light source is not disposed in facing relationship to the image read line.

In the above-described image reading apparatus, the light guide member has a flat light incidence surface. Light entering the light guide member through the light incidence surface is emitted through a light exit surface toward the image read line. However, the light guide member with the flat light incidence surface has the following problems.

Generally, light emitted from the light source has a tendency to diverge as it travels. Since the light incidence surface of the prior art light guide member is flat, the light entering the light guide member through the light incidence surface continues to diverge within the light guide member. Therefore, the amount of light directed toward the light exit surface is reduced. Specifically, most of the light entering the light guide member travels toward the light exit surface while being totally reflected by the surfaces of the light guide member. However, since light disperses in various directions within the light guide member, a large amount of light impinges on the surfaces of the light guide member at an angle smaller than the total reflection critical angle, thereby passing through the light guide member. As a result, the amount of light guided toward the light exit surface is reduced, resulting in deterioration of the image reading quality.

Moreover, even if a large amount of light is guided toward the light exit surface, it is difficult to efficiently illuminate the image read line because the light is not converged.

Thus, the prior art image reading apparatus needs to be improved to enhance efficiency in illuminating the image read line.

SUMMARY OF THE INVENTION

It is therefore an object of the present invention to provide an image reading apparatus which is capable of effectively illuminating an image read line of a document.

An object of the present invention to provide a light guide member which may be advantageously incorporated in such an image reading apparatus.

In accordance with a first aspect of the present invention, an image reading apparatus comprises at least one light source, an elongate light guide member for guiding light emitted from the light source toward an image read line, and a plurality of light receiving elements for receiving light reflected at the image read line. The light guide member includes a first portion, a second portion, and a connecting portion for connecting the first portion and the second portion. The first portion includes a light incidence surface facing the light source for entry of light emitted from the light source, and the light incidence surface is convexly curved widthwise of the light guide member. The second portion includes a light exit surface oriented toward the image read line for emitting light toward the image read line. The connecting portion is narrower than the first portion and the second portion.

Preferably, the first portion of the light guide member further may include additional light exit surfaces each of which is convexly curved, whereas the second portion of the light guide member may further include an additional light incidence surface facing each light exit surface of the first portion.

Preferably, the first portion, the second portion and the connecting portion may be formed of transparent resin as one piece.

Preferably, the connecting portion may be located on a widthwise center axis of the first portion, and the widthwise center axis of the first portion may be located directly above the light source.

Preferably, the light exit surface of the second portion may be convexly curved at least partially.

Preferably, the light exit surface of the second portion may be offset widthwise toward the image read line relative to the light incidence surface of the first portion.

According to a second aspect of the present invention, there is provided an image reading apparatus which comprises at least one light source, an elongate light guide member for guiding light emitted from the light source toward an image read line, and a plurality of light receiving elements for receiving light reflected at the image read line. The light guide member includes a first portion, a second portion, and a connecting portion for connecting the first portion and the second portion. The first portion includes a first light incidence surface facing the light source for entry of light emitted from the light source, and at least one first light exit surface facing the second portion and convexly curved. The second portion includes at least one second light incidence surface facing the first light exit surface of the first portion for reentry of light, and a second light exit surface oriented toward the image read line for emitting light toward the image read line. The connecting portion is narrower than the first portion and the second portion.

According to a third aspect of the present invention, there is provided an elongate light guide member which comprises a first portion, a second portion, and a connecting portion connecting the first portion and the second portion. The first portion includes a light incidence surface oriented away from the second portion for entry of light and convexly curved widthwise of the light guide member. The second portion includes a light exit surface oriented away from the first portion for emitting light. The connecting portion is narrower than the first portion and the second portion.

Preferably, the first portion of the light guide member may further include additional light exit surfaces each of which is convexly curved, and the second portion of the light guide member may further include an additional light incidence surface facing each light exit surface of the first portion.

Preferably, the first portion, the second portion and the connecting portion may be formed of transparent resin as one piece.

Preferably, the connecting portion may be located on a widthwise center axis of the first portion.

Preferably, the light exit surface of the second portion may be convexly curved at least partially.

Preferably, the second portion includes a pair of side surfaces which are inclined with respect to a widthwise center axis of the first portion.

According to a fourth aspect of the present invention, there is provided an elongate light guide member which comprises a first portion, a second portion, and a connecting portion connecting the first portion and the second portion. The first portion includes a first light incidence surface oriented away from the second portion for entry of light, and at least one first light exit surface facing the second portion and convexly curved. The second portion includes at least one second light incidence surface facing the first light exit surface of the first portion for reentry of light, and a second light exit surface oriented away from the first portion for emitting light. The connecting portion is narrower than the first portion and the second portion.

Other features and advantages of the present invention will become clearer from the detailed description given below with reference to the accompanying drawings.

DETAILED DESCRIPTION OF THE PREFERRED EMBODIMENTS

Preferred embodiments of the present invention will be described below in detail with reference to the accompanying drawings.

Figure 1:
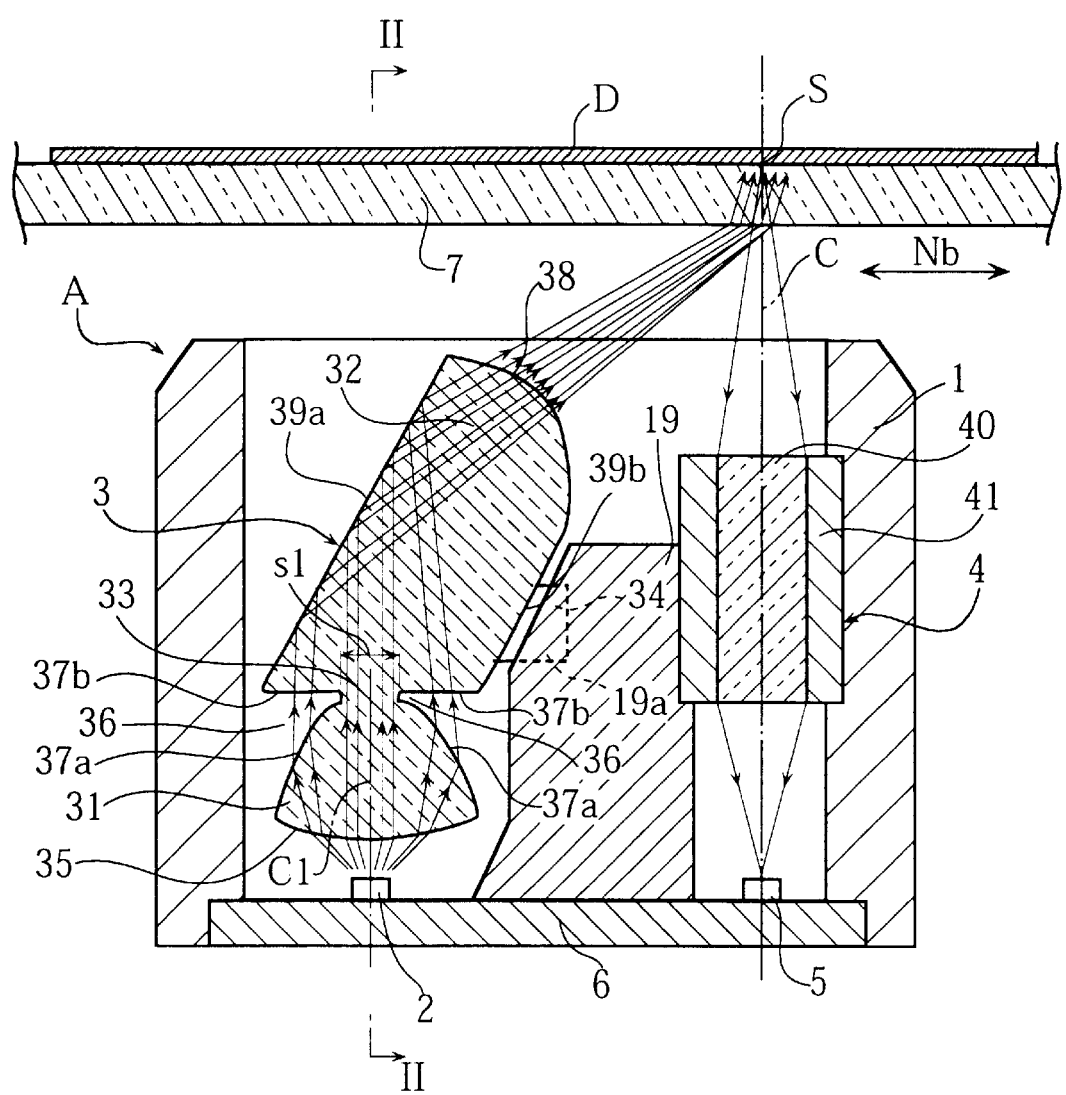
FIG. 1 is a sectional view showing an image reading apparatus embodying the present invention.
Figure 2:
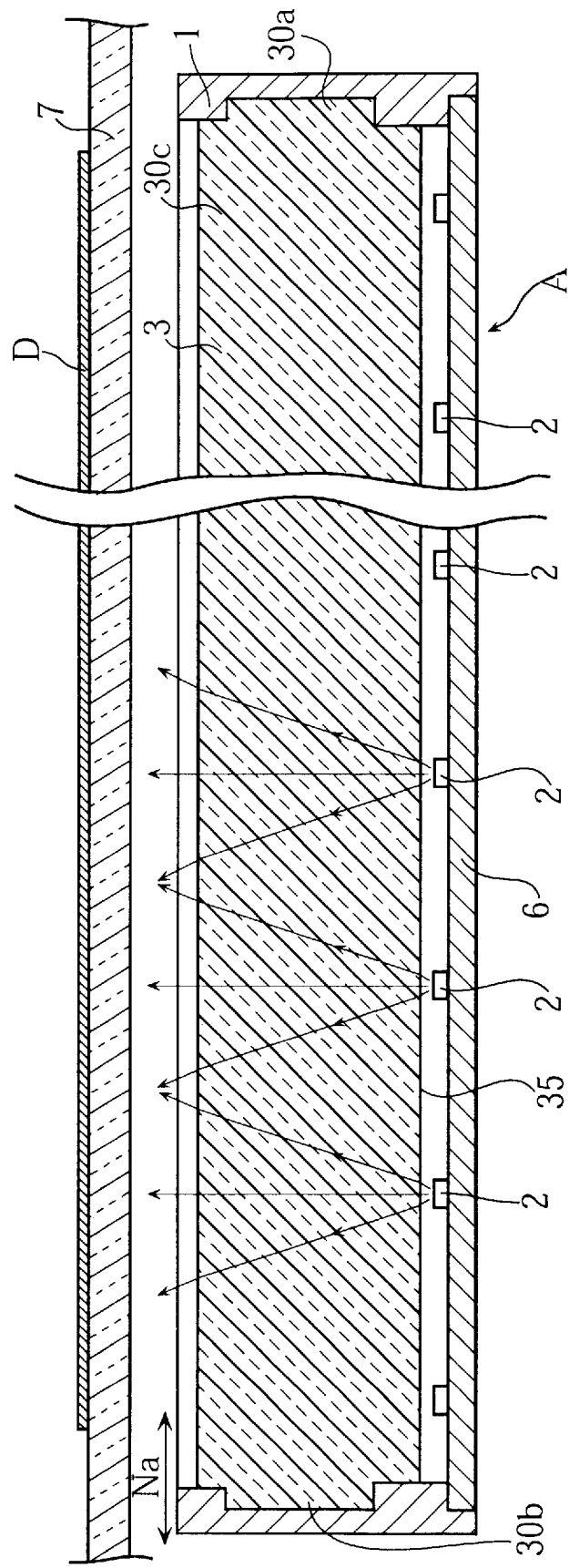
FIG. 2 is a sectional view taken along lines II-II in FIG. 1.

FIGS. 1 and 2 illustrate an example of image reading apparatus in accordance with the present invention. FIG. 3 illustrates an example of light guide member in accordance with the present invention. In this embodiment, the present invention is applied for a so-called flat bed type image reading apparatus for reading an image of a document disposed on a transparent document supporting panel.

The illustrated image reading apparatus A is elongate in a primary scanning direction indicated by an arrow Na in FIG. 2. The image reading apparatus A generally comprises a plurality of light sources 2, a light guide member 3, a lens array 4, a row of light receiving elements 5, a substrate 6, a housing 1 for accommodating these components, and a document supporting panel 7.

The housing 1 is made of a synthetic resin. The housing 1 is supported by a non-illustrated movable member below the document supporting panel 7 for movement in a secondary scanning direction indicated by an arrow Nb in FIG. 1. The substrate 6 is mounted at the bottom of the housing 1.

The lens array 4 comprises a row of image forming lenses 40 extending in the primary scanning direction, and a holder 41 made of a synthetic resin for holding the lenses 40. Each of the lenses 40 may be a selfoc lens (self focusing lens) capable of forming an actual size erect image of a document D. Alternatively, use may be made of other lenses such as a convex lens. On the document supporting panel 7, an image read line S extending in the primary scanning direction is defined in alignment with the row of lenses 40.

The row of light receiving elements 5 for photoelectric conversion is disposed directly below the lens array 4 on the substrate 6 in alignment with the lens array 4. When each of the light receiving elements 5 receives light reflected on the image read line S and collected by the lens array 4, the light receiving element 5 outputs signals corresponding to the received amount of light.

The light sources 2 are arranged on the substrate 6 at a predetermined pitch in a row extending in the primary scanning direction. Each of the light sources 2 may comprise an LED for example.

The light guide member 3 may be formed by molding a transparent resin such as PMMA (polymethyl methacrylate (methacrylate resin)) or polycarbonate. The light guide member 3, which is elongate in the primary scanning direction, generally comprises a body 30c having a uniform cross section, and a pair of engaging portions 30a, 30b provided at longitudinally opposite ends of the body 30c. All surfaces of the light guide member 3 are mirror-finished. Therefore, when light traveling within the light guide member 3 impinges on the mirror surfaces of the light guide member 3 at an angle larger than the total reflection critical angle (which is determined depending on the material of the light guide member), it is totally reflected. On the other hand, light impinging on the mirror surfaces of the light guide member 3 at an angle smaller than the critical angle passes therethrough. The surfaces of the light guide member 3 need not necessarily be polished to serve as mirror surfaces. In the present invention, mirror surfaces may be provided by resin-molding the light guide member 3 to have smooth surfaces.

Figure 3A:
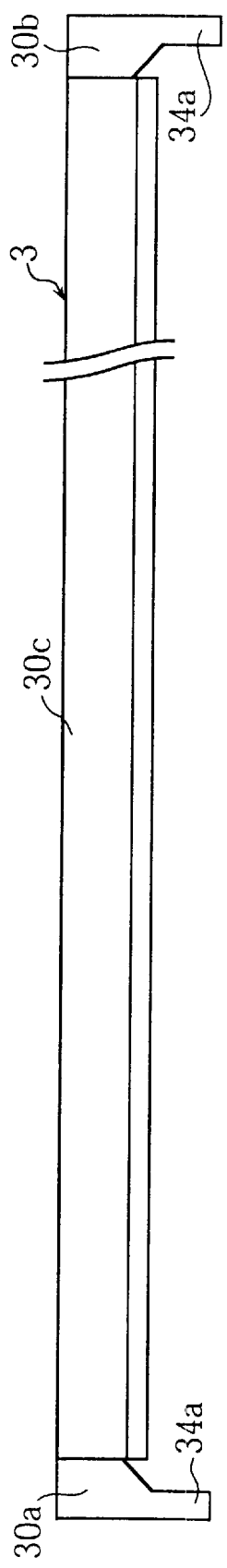
FIG. 3a is a plan view of a light guide member incorporated in the image reading apparatus shown in FIG. 1.
Figure 3B:
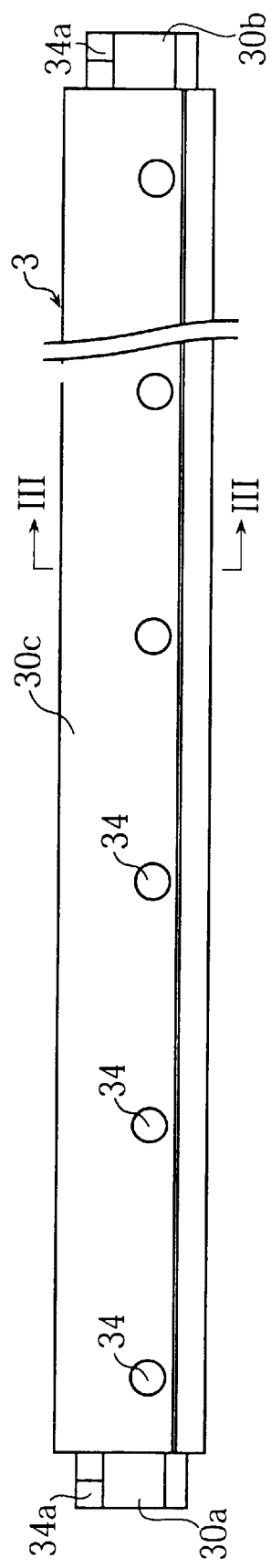
FIG. 3b is a front view of the same light guide member.
Figure 3C:
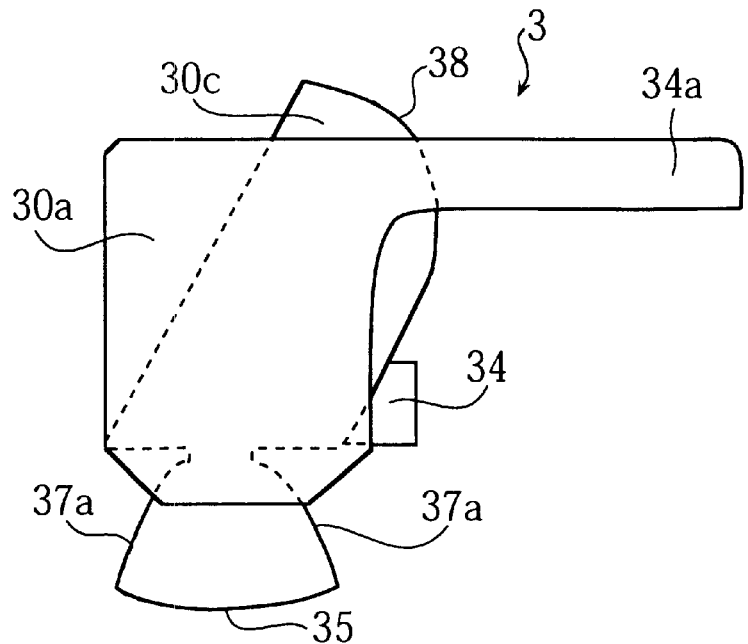
FIG. 3c is a left side view of the same light guide member.
Figure 3D:
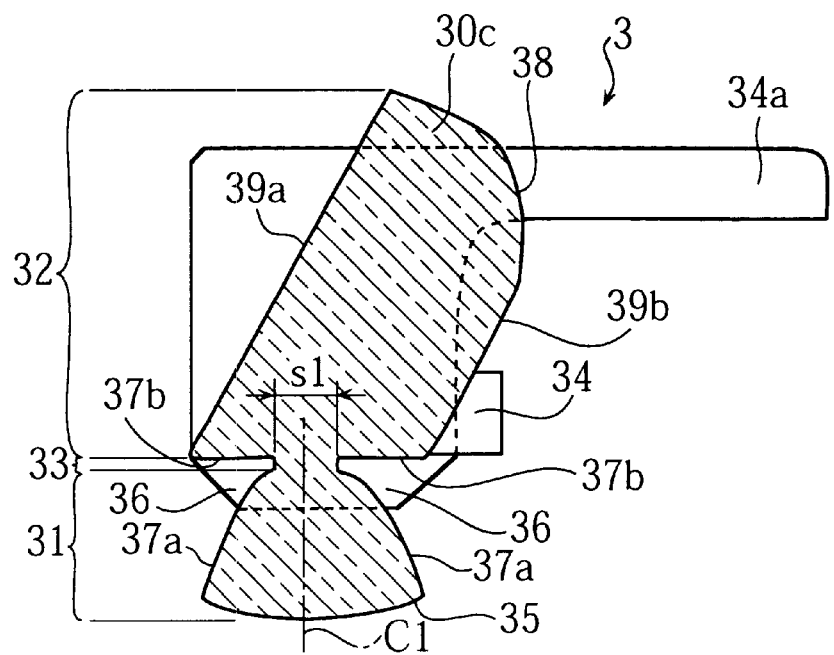
FIG. 3d is a sectional view taken along lines III-III in FIG. 3b.

As clearly shown in FIGS. 1 and 3d, the body 30c of the light guide member 3 comprises a first or lower portion 31, a second or upper portion 32 and a connecting neck portion 33.

The lower portion 31 has a first light incidence surface 35 which is downwardly convex, and a pair of first light exit surfaces 37a each of which is laterally and upwardly convex.

The connecting neck portion 33 connects the lower portion 31 and the upper portion 32. The provision of the connecting neck portion 33 allows the lower portion 31 and the upper portion 33 to be integrally formed. In this embodiment, the light guide member 3 as a whole is formed as one piece. The connecting neck portion 33 is arranged so that a widthwise center of the connecting neck portion 33 coincides with a widthwise center axis C1 of the lower portion 31. The connecting neck portion 33 has a smaller width s1 than the lower and the upper portions 31, 32. As a result, a pair of recesses 36 opposed widthwise of the light guide member 3 are formed between the lower portion 31 and the upper portion 32.

The upper portion 32 comprises a second light exit surface 38, a pair of side surfaces 39a, 39b, and a pair of second light incidence surfaces 37b. The second light incidence surfaces 37b face the first light exit surfaces 37a of the lower portion 31, respectively. Each second light incidence surface 37b is flat in this embodiment but may be convex.

The side surface 39a is inclined so that light entering the upper portion 32 from the lower portion 31 is totally reflected at the side surface 39a toward the second light exit surface 38. The second light exit surface 38 emits the light reflected by the side surface 39a to the outside. The second light exit surface 38 is made entirely or generally entirely convex laterally upward.

As clearly shown in FIG. 1, the light guide member 3 is arranged in the housing 1 with the widthwise center axis C1 of the lower portion 31 positioned directly above the light sources 2 so that the first light incidence surface 35 faces the light sources 2. The second light exit surface 38 is oriented toward a reverse surface of the document supporting panel 7. As clearly shown in FIG. 3, each of the engaging portions 30a, 30b is formed with a projection 34a which fits into a non-illustrated recess of the housing 1, thereby positioning the light guide member 3 relative to the housing 1. Further, the side surface 39b of the upper portion 32 is formed with a plurality of projections 34 each of which fits into a corresponding recess 19a formed in a partition member 19 of the housing 1. As a result, the light guide member 3 is positively positioned relative to the housing 1.

The image reading apparatus A having the above-described structure operates as follows.

Referring to FIG. 1, when the light sources 2 are turned on, light emitted from the light sources 2 enters the lower portion 31 through the first light incidence surface 35. At this time, since the first light incidence surface 35 is convexly curved, it works to refract the light substantially in the same way as a convex lens. As a result, the light diverging from the light sources 2 converges widthwise in entering the lower portion 31.

After the light enters the lower portion 31, a portion of light traveling at or near the widthwise center axis C1 of the lower portion 31 directly enters the upper portion 32 through the connecting neck portion 33. On the other hand, a portion of light traveling away from the widthwise center axis C1 exits the lower portion 31 through the first light exit surfaces 37a, passing through the recesses 36 and the reentry surfaces 37b before entering the upper portion 32. At this time, since each of the first light exit surfaces 37a is convexly curved, the diverging portion of light impinging on the first light exit surface 37a is again refracted inwardly widthwise. In this way, the widthwise light is twice refracted inwardly. As a result, the light emitted from the light sources 2 can be reliably guided into the upper portion 2 generally along the widthwise center axis C1 of the lower portion 1.

The light entering the upper portion 32 reaches the side surface 39a. At this time, since the light travels in parallel or generally parallel with the center axis C1, the entire or almost entire portion of light is totally reflected by the side surface 39a. Thus, a large amount of light can be directed toward the light exit surface 38, and hence to the image read line S. As a result, it is possible to effectively illuminate the image read line S, thereby enhancing the image reading quality.

By contrast, light emitted from the light sources 2 diverges longitudinally of the light guide member 3. However, light is not converged in this direction so that the image read line S can be effectively illuminated over its entire length.

The specific structure of the image reading apparatus and the light guide m ember of the present invention is not limited to the embodiment described above but may be modified in various ways.

For example, the connecting neck portion may be a transitional portion indistinguishable from the lower portion and the upper portion. In other words, the lower and the upper portion may be connected directly. In this case, the portion at which the lower and the upper portions are connected may be regarded as a connecting neck portion.

In the embodiment described above, the present invention is applied to a flat bed type image reading apparatus. However, the present invention is applicable to other type of image reading apparatus such as a sheet feed type image reading apparatus in which image reading is performed with the document transferred in the secondary scanning direction by a platen roller, or an image reading apparatus for reading images on an electronic white board to make a copy of the image thereon.

Further, a cold cathode tube may be employed as a light source instead of LEDs.

What is claimed is:

1. An image reading apparatus comprising:
at least one light source;
an elongate light guide member for guiding light emitted from the light source toward an image read line; and
a plurality of light receiving elements for receiving light reflected at the image read line;
wherein the light guide member includes a first portion, a second portion, and a connecting portion for connecting the first portion and the second portion;
wherein the first portion includes a light incidence surface facing the light source for entry of light emitted from the light source, the light incidence surface being convexly curved widthwise of the light guide member;
wherein the second portion includes a light exit surface oriented toward the image read line for emitting light toward the image read line; and
wherein the connecting portion is narrower than the first portion and the second portion.

2. The image reading apparatus according to claim 1, wherein the first portion of the light guide member further includes additional light exit surfaces each of which is convexly curved, the second portion of the light guide member further including an additional light incidence surface facing each light exit surface of the first portion.

3. The image reading apparatus according to claim 1, wherein the first portion, the second portion and the connecting portion are formed of transparent resin as one piece.

4. The image reading apparatus according to claim 1, wherein the connecting portion is located on a widthwise center axis of the first portion.

5. The image reading apparatus according to claim 4, wherein the widthwise center axis of the first portion is located directly above the light source.

6. The image reading apparatus according to claim 1, wherein the light exit surface of the second portion is convexly curved at least partially.

7. The image reading apparatus according to claim 1, wherein the light exit surface of the second portion is offset widthwise toward the image read line relative to the light incidence surface of the first portion.

8. An image reading apparatus comprising:
at least one light source;
an elongate light guide member for guiding light emitted from the light source toward an image read line; and
a plurality of light receiving elements for receiving light reflected at the image read line;
wherein the light guide member includes a first portion, a second portion, and a connecting portion for connecting the first portion and the second portion;

wherein the first portion includes a first light incidence surface facing the light source for entry of light emitted from the light source, and at least one first light exit surface facing the second portion, the first light exit surface being convexly curved;

wherein the second portion includes at least one second light incidence surface facing the first light exit surface of the first portion for reentry of light, and a second light exit surface oriented toward the image read line for emitting light toward the image read line; and wherein the connecting portion is narrower than the first portion and the second portion.

9. An elongate light guide member comprising:

a first portion;

a second portion; and a connecting portion connecting the first portion and the second portion;

wherein the first portion includes a light incidence surface oriented away from the second portion for entry of light, the light incidence surface being convexly curved widthwise of the light guide member;

wherein the second portion includes a light exit surface oriented away from the first portion for emitting light; and wherein the connecting portion is narrower than the first portion and the second portion.

10. The light guide member according to claim 9, wherein the first portion of the light guide member further includes additional light exit surfaces each of which is convexly curved, the second portion of the light guide member further including an additional light incidence surface facing each light exit surface of the first portion.

11. The light guide member according to claim 9, wherein the first portion, the second portion and the connecting portion are formed of transparent resin as one piece.

12. The light guide member according to claim 9, wherein the connecting portion is located on a widthwise center axis of the first portion.

13. The light guide member according to claim 9, wherein the light exit surface of the second portion is convexly curved at least partially.

14. The light guide member according to claim 9, wherein the second portion includes a pair of side surfaces which are inclined with respect to a widthwise center axis of the first portion.

15. An elongate light guide member comprising:

a first portion;

a second portion; and a connecting portion connecting the first portion and the second portion;

wherein the first portion includes a first light incidence surface oriented away from the second portion for entry of light, and at least one first light exit surface facing the second portion, the first light exit surface being convexly curved;

wherein the second portion includes at least one second light incidence surface facing the first light exit surface of the first portion for reentry of light, and a second light exit surface oriented away from the first portion for emitting light; and wherein the connecting portion is narrower than the first portion and the second portion.

* * * * *